United States Patent [19]
Aidlin et al.

[11] 3,722,659
[45] Mar. 27, 1973

[54] APPARATUS FOR ORIENTING AND FEEDING BOTTLES, OR LIKE ARTICLES

[75] Inventors: Samuel S. Aidlin; Stephen H. Aidlin, both of Brooklyn; David Rich, Merrick, all of N.Y.

[73] Assignee: Aidlin Automation, Inc., Brooklyn, N.Y.

[22] Filed: Oct. 7, 1971

[21] Appl. No.: 187,330

[52] U.S. Cl. ............................................. 198/33 AC
[51] Int. Cl. ............................................. B65g 47/24
[58] Field of Search ...... 198/33 AC, 33 AA, 197, 198

[56] References Cited

UNITED STATES PATENTS

| | | | |
|---|---|---|---|
| 3,144,740 | 8/1964 | Erickson et al. | 198/33 AC |
| 1,124,414 | 1/1915 | Gilliam | 198/198 |
| 3,477,559 | 11/1969 | Raasch | 198/198 |

Primary Examiner—Harvey C. Hornsby
Assistant Examiner—James W. Miller
Attorney—Victor M. Helfand

[57] ABSTRACT

Apparatus for orienting and feeding bottles, or like articles having necks at one end, in which the bottles are haphazardly picked up from the bin by spaced pairs of spaced alined cleats on an endless conveyor belt whose upper portion is horizontally disposed with means provided along such upper portion to engage the center of the bottle length to gradually elevate each bottle and tilt it into upright position to rest on its base to either side of the elevating means. Means are provided for translating the uprighted bottles on either side of the elevating means to a conveyor that is level with the outlet end of the bottle elevating and uprighting means.

12 Claims, 6 Drawing Figures

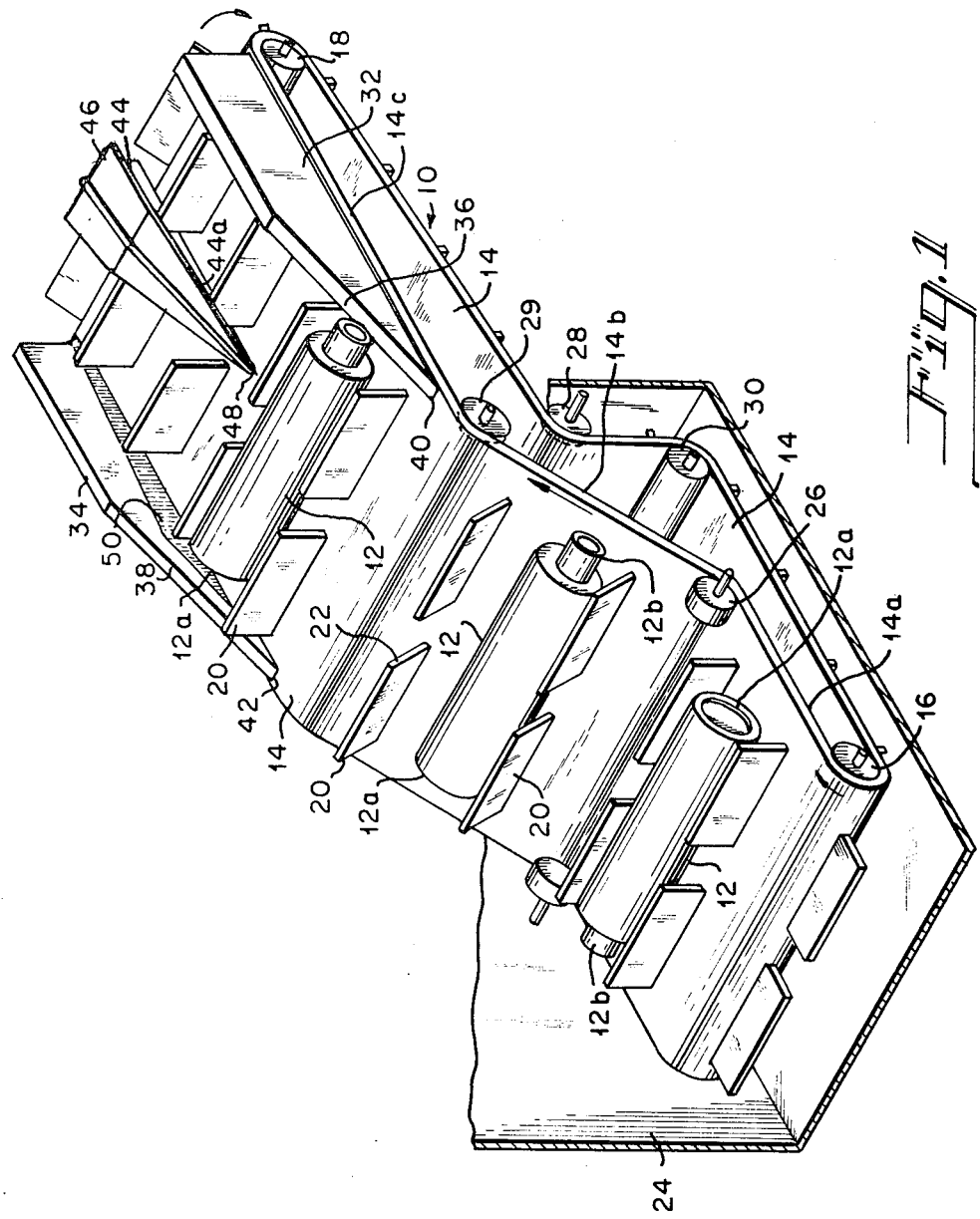

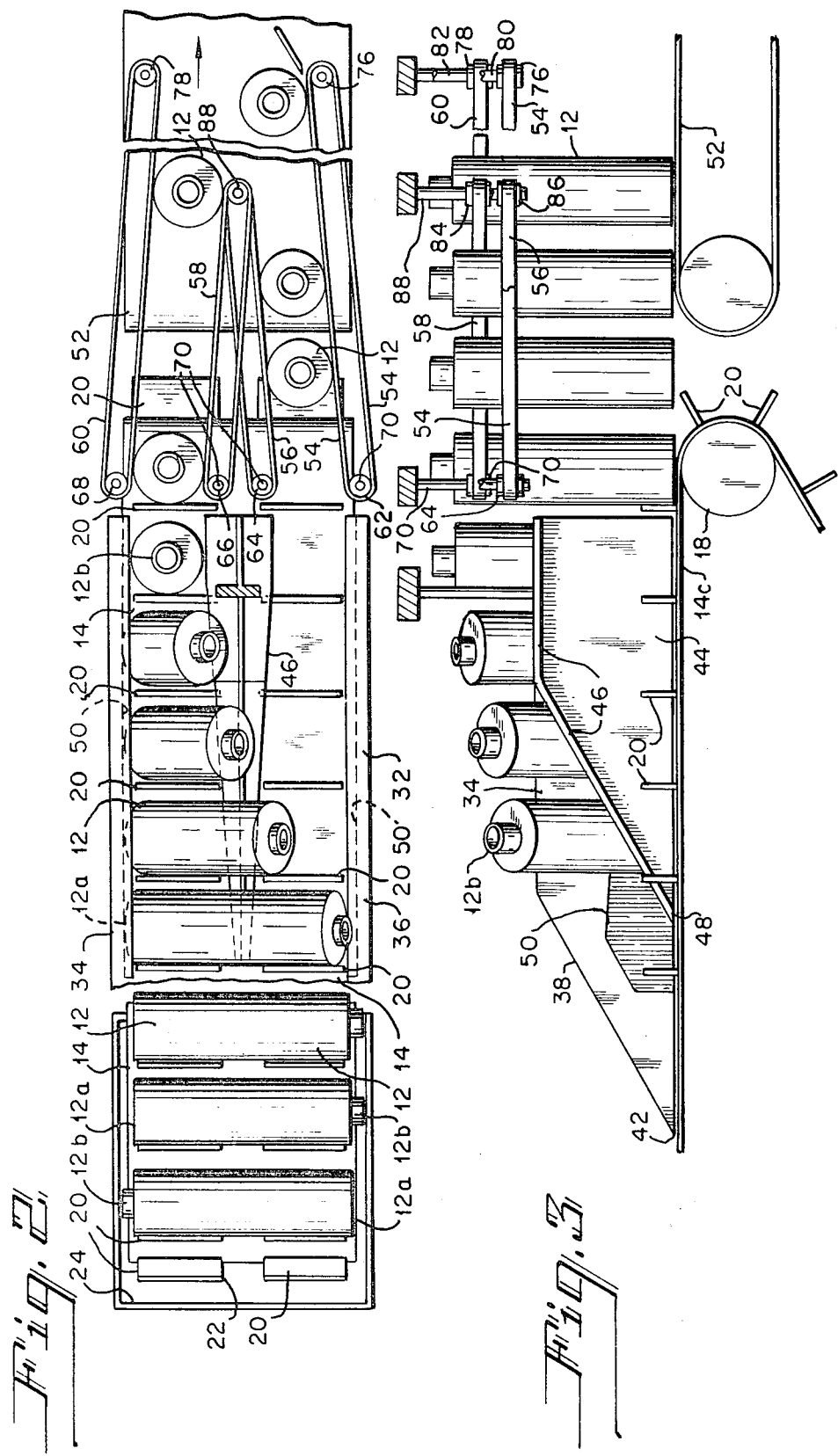

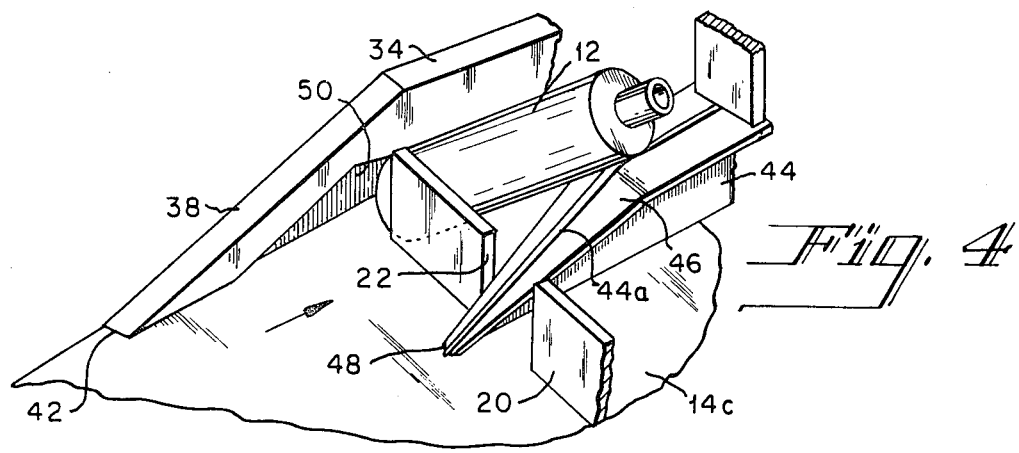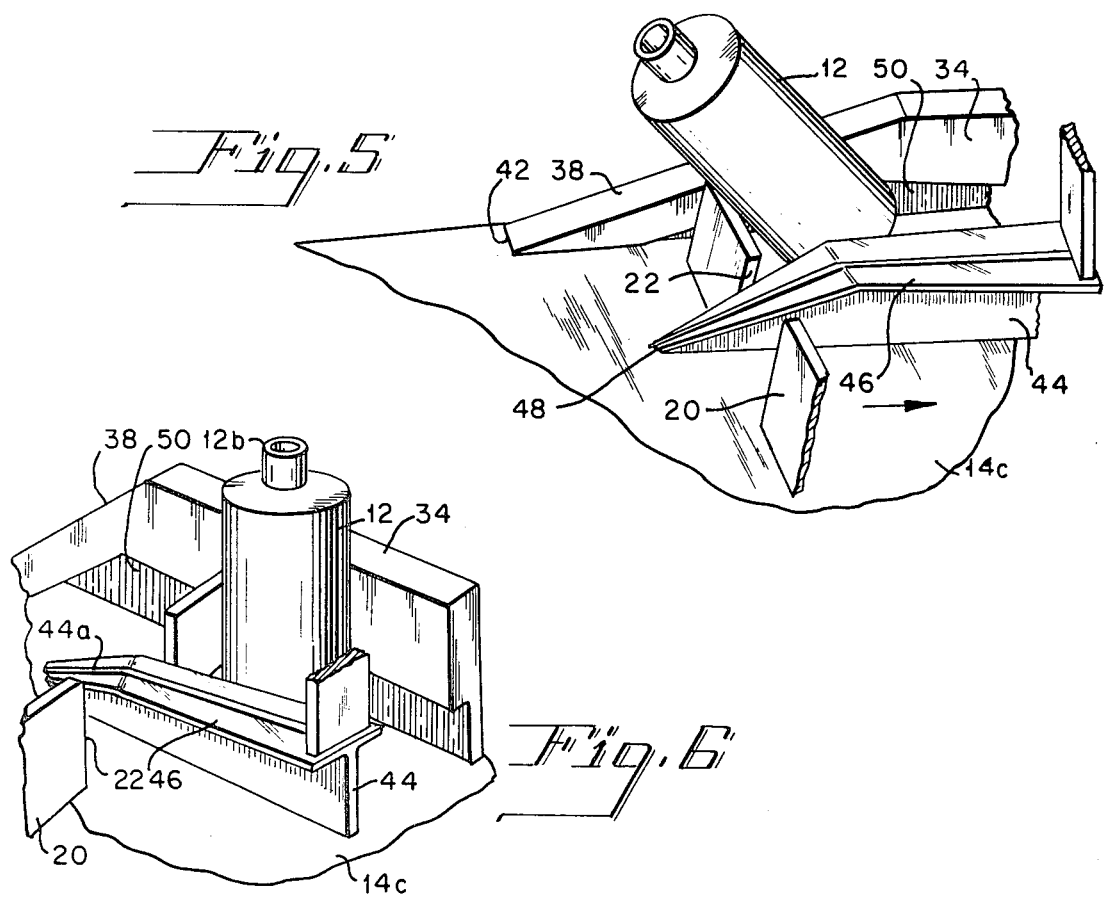

APPARATUS FOR ORIENTING AND FEEDING BOTTLES, OR LIKE ARTICLES

The present invention relates to apparatus for orienting and feeding bottles, or like articles, in proper position for conveyance to a station where they are to be processed, as by filling and capping.

Orienting and feeding apparatus for bottles, or like articles, of the type heretofore in use, are, generally, of the rotary or vibrating hopper type, where the bottles are haphazardly picked up from a pile at the bottom of the hopper and moved toward a discharge chute and only selected ones so moved; namely, those in properly oriented position, are discharged through the cute; the others being returned to the bottom of the hopper for successive haphazard pick up. Such apparatus necessarily feed oriented articles at a relatively low rate of speed. Such apparatus also, because they are formed substantially entirely of metal, are relatively noisy, especially when speeded up to increase the rate of feeding of oriented bottles. Further, such apparatus, especially those of the rotary hopper type, are clumsy and bulky and occupy a great deal of floor space. For the latter reason, it is not generally practical to arrange a bank of such apparatus to feed their oriented articles to a common conveyor to thereby attain a rapid supply of such oriented articles.

It is the object of the present invention, therefore, to provide orienting and feeding apparatus for bottles, or like articles, which will properly orient and feed each and every article picked up from the bottom of a bin, without returning any of them back into the bin, to thereby attain a high rate of feeding the oriented articles.

It is also an object of the present invention to provide apparatus of the character described which may be operated at relatively high speed so that articles from the haphazardly arranged pile of the bottom of the bin will be picked up at a higher rate of speed, thereby further increasing the rate of feeding oriented articles by the apparatus.

It is still another object of the present invention to provide apparatus of the character described wherein the moving parts that pick up the bottles and deliver them to the point of discharge are non-metallic and, therefore, render the apparatus relatively less noisy.

It is a further object of the present invention to provide apparatus of the character described which delivers bottles oriented thereon directly to a conveyor that is level with the outlet end of the feeding and orienting mechanism of the apparatus, and which will convey them to a point of destination, to thereby eliminate any kind of chute, whereby such apparatus is particularly adapted for use with light-weight bottles or the like formed of synthetic plastic material which have a propensity for bouncing.

It is a still further object of the present invention to provide apparatus of the character described which are of relatively simple and compact construction and occupy minimal floor space; which are sturdy and durable and relatively economical to produce.

The foregoing and other objects and advantages of the apparatus of the present invention will become more readily apparent to those skilled in the art from the embodiment thereof shown in the accompanying drawing and from the description following. It is to be understood, however, that such embodiment is shown by way of illustration only to make the principles and practice of the invention more readily comprehensible and without any intent of limiting the invention to the specific details therein shown.

In the drawings:

FIG. 1 is a schematic, isometric view of an escalator for the apparatus of the present invention, and of the bottle uprighting means thereof; the bottle supply bin being shown in fragmentary, sectional form;

FIG. 2 is a top plan view, of the apparatus of FIG. 1, together with the means transferring the erected bottles to a conveyor;

FIG. 3 is a side elevational view of the apparatus of FIG. 2; and

FIGS. 4, 5, and 6 are schematic representations of the several steps in the erection of bottles on the apparatus.

Generally stated, the present invention contemplates the provision of orienting and feeding apparatus in which bottles, or like articles, having neck portions at one end, or similar end portions of reduced cross section, are haphazardly picked up by spaced, alined cleats of an endless elevator or escalator band from a pile of such articles haphazardly disposed in a bin. The belt may be of only slightly greater width than the bottles and the bin of slightly greater width than the band. The bottles moved on the escalator are automatically uprighted while on the escalator by a balancing plate supported over the center of the escalator band and cleared in the space between the cleats; the balancing plate tapering and widening upwardly to gradually tilt the bottles in the direction of their heavier, wider base portions to either side thereof until they are erect, at which point they are transferred directly from the escalator to a conveyor belt. Side walls are provided alongside of the escalator band opposite the balancing plate, to retain the uprightly moved bottles on the escalator.

Referring now more specifically to the embodiment of the invention schematically illustrated in the accompanying drawing, the same is shown to comprise an escalator, generally designated as 10, for the bottles 12, having base portions 12a and neck portions 12b. Escalator 10 comprises an endless belt 14 mounted in generally upwardly slanting position over end rollers, including a lower roller, 16, and an upper roller 18, either one of which may be made the driving roller with the other one being an idler. Belt 14 may be of a width slightly greater than the height of a bottle 12 and is provided with spaced, transversely alined pairs of cleats, 20, that are spaced from one another at the center of the belt to provide a passageway, 22, between them and terminate short of the edges of the belt 14.

Rollers 16 and 18 may be supported from any desired auxilliary structure that may be associated with the escalator, numerous variation of which will readily suggest themselves to any one skilled in the art, and, therefore, not thought necessary to be specifically shown. It may here be stated, that other elements of the apparatus may likewise be supported from such auxilliary structure, which may be in any suitable form adapted for the purpose.

The lower end of the escalator 10 is disposed within a bin, 24, adapted to hold a pile of bottles. Preferably, bin 24, is of a width just sufficient to accommodate the belt 14 and, therefore, of a width not much in excess of the length of a bottle 12, so that the bottles of the pile within the bin will automatically arrange themselves with their longitudinal axes parallel to the escalator belt 14, for ready pick up by cleats 20; the bottles having their neck haphazardly arranged in opposed directions. Preferably, the lower portion, 14a, of the escalator may be horizontally disposed within the bin 24 (FIG. 1) for improved bottle pick up, and may rise out of the bin in an upwardly tilted direction, as indicated at 14b, and thereafter, if desired, tilted downwardly to horizontal position, as indicated at 14c. Such arrangement may be provided by the narrow idler rollers, 26 and 28, that overlie and engage the marginal edge portion of the belt 14 and the rollers, 28 and 30; that may underlie the full width of the belt 14. All such idler rollers may likewise be supported, in any desired manner, from an axillary structure, as mentioned above.

The bottle uprighting mechanism of the escalator comprises a pair of side walls, 32 and 34, suitably supported from a supporting structure over the marginal edge portions of belt 24, longitudinally along the upper section 14c thereof, with their bottom edges in close proximity to the surface of belt 14. Side walls 32 and 34, is each preferably formed with an inwardly and downwardly tapering lead portion 36 and 38, respectively, which terminates in a relatively sharp lead edge, 40 and 42, respectively. Side walls 32 and 34 are preferably of a maximum height in excess of the thickness of a bottle 12 to be fed by the apparatus.

The bottle uprighting mechanism also includes a bottle balancing or tipping wall or panel, 44, rigidly supported longitudinally of the center of belt portion 14c, with its bottom edge in close proximity to the surface thereof, in position to be cleared through passageway 22 between alined cleats 20. Panel 44 may be supported from an overhead structure which, in turn, may be supported on the auxiliary structure, referred to above, in a manner that will be clear to any one skilled in the art. Balancing panel 44 has an upwardly sloping inner lead portion 44a, which rise from its bottom edge to a height equal at least to half the height of the bottle 12, and may thereafter straighten out to be substantially parallel with the bottom edge of the panel. The top edge of the panel may gradually widen or diverge upwardly and outwardly, as by the provision of an acutely-angled wedge-shaped plate, 46, mounted thereof; such plate widening to each side of the panel to a point where the space between each edge thereof and the adjacent side wall 32 or 34, as the case may be, is approximately equal to the thickness of the body of a bottle. Preferably, the balancing panel 44 may be offset outwardly over escalator 10 relative to walls 32 and 34, so that its lead edge 48 is outwardly spaced from the lead edges 40 and 42 of the side walls.

The feeding and orienting operation will now become apparent. A bottle 12, picked up by a pair of alined cleats 20, from the pile in bin 24 will be moved upwardly towards the lead edges, 40, 42 and 48, of the side walls and of the balancing panel. If the bottle is evenly centered on the conveyor and escalator belt 14, it will pass between side walls 32 and 34, in horizontal position, resting on the supporting cleats 24, until it reaches the balancing panel 44. Continued movement of the belt 14 will elevate the bottle 12 from the belt 14, on the sloping portion of the panel, causing its heavier, base portion 12c to overbalance in the direction of the wall 32 or 34, adjacent thereto, as the case may be, and raising the neck portion 12a thereof. As the cleats continue to move the bottle upwardly, the widening of the plate 46 will cause the bottle to be gradually erected; the side wall adjacent the base of the bottles serving to confine it for that purpose. As the escalator continues to move upwardly, the bottle will be completely erected, and will be moved outwardly in either of the two lanes on the escalator formed between panel 44 and walls 32 and 34.

In order to facilitate the erection of the bottle and preventing its displacement from the overbalanced position in the direction of its base end, each wall, 32 and 34, may be provided with a downwardly facing shoulder, 50, on its inner surface, with the inner end of the shoulder at approximately a height above belt 14 equal the thickness of the bottle at the base thereof, and gradually sloping downwardly outwardly. It will be clear, that as a bottle is tilted with its base in the direction of the adjacent wall, the upper edge portion of its base will be caught under the shoulder 50 which, as it slants outwardly and downwardly, will cooperate with the adjacent edge of wedged-shaped plate 46 to assure the uprighting to the bottle (FIGS. 4, 5, and 6).

It will be clear that any bottle whose base faces wall 32 will be erected between balancing panel 44 and that wall, and be advanced through the lane defined between them; and that any bottle whose base faces side wall 32 will be erected to be moved in erected position in the lane defined between them.

While the width of the bin may be adequate to properly locate the bottle on the moving cleats so that the center of its length will be substantially opposite the balancing panel 44 and its heavier base end will automatically drop by gravity to the belt 14, additional means for insuring such centering, and to retain the bottle in centered position may be provided, these may be in the form of low guard rails along the marginal edge portions of the belt 14 against which the bases of the bottles may abut, which guard rails may be extensions of walls 32 and 34; all in a manner that will be readily understood. If a bottle is slightly displaced or when it is not centered on balancing panel 44, its neck portion will be elevated by the lead edge of the wall adjacent thereto before the bottle reaches lead edge 48 of the panel 44 and will partially be tilted by the forward slope of such wall to slide towards the other side wall, to thereby insure the centering of the bottle and its tilting by panel 44 in the direction of its base.

Means are provided in association of the escalator 10 for translating bottles from the escalator to a conveyor, schematically illustrated at 52, whose one end is in close proximity to the outer or outlet end of the escalator and substantially at a level therewith. Such means may comprise two pairs of parallel endless gripping belts, 54 and 56 and 58 and 60, each pair opposite and overhanging the end of one of the two bottle lanes for erected bottles formed between the edges of wedge plate 46 and the adjacent wall 32 or 34, as the case may be. The end of each endless gripping belt of each pair that overhangs the escalator, may be disposed around a sheave, 62, and 64 and 66 and 68, respectively; each individually supported on a spindle 70 that may be supported from above from any suitable auxilliary structure and by any suitable means.

Preferably, the pairs of gripping belts for the two bottle lanes may be arranged at slightly vertically offset levels, relative to one another, as indicated in FIG. 2 of the drawings, where gripping belts 54 and 56 are shown to be at a level below gripping belts 58 and 60. Also the outer of each pair of belts, 54 and 60, respectively, are disposed at a converging angle to one another and are relatively longer than their respective companion belts 56 and 58, and have their other ends mounted over sheaves, 76 and 78, respectively, which are supported on individual spindles, 80 and 82 (FIGS. 2 and 3). Shorter belts 56 and 58 of the two pair are mounted on the individual sheaves, 84 and 86, respectively, which are freely rotatably mounted on a common spindle, 88 (FIG. 3). Spindles 80 and 82 may be supported from above from an auxilliary structure, as heretofore stated, and sheaves 76 and 78 may be idlers. Spindle 88 may likewise be supported from above and sheaves 84 and 86 are likewise idlers. Sheaves 62, 64, 66, and 68 are fixedly supported on spindles 70, which may be driven or rotated by suitably mounted and connected motors; the spindles for sheaves 62 and 64 and the spindle for sheaves 66 and 68 being operated by individual motors or from the same motor by individual gearing, in a manner that will be readily understood.

It may here be stated that belt 14, belts 52, and gripping belts 54, 56, 58, and 60 may all be operated at the same linear speed to insure the smooth and even translation of bottles by the gripping belts from belt 14 to belt 52.

This completes the description of the bottle orienting and feeding apparatus of the present invention. It will be readily apparent that, because all bottles received on the conveyor are properly oriented, it will deliver oriented bottles at a high rate of speed. It will also be apparent that because the bottle-moving mechanism of the apparatus and the bin from which it picks up the bottles are not substantially wider than the length of a bottle, such apparatus is compact and will occupy a minimum of space, as well as assure the pick up of a bottle by each set of cleats on the escalator belt. It will be additionally apparent that, because the moving parts of the escalator are non-metallic, the apparatus will operate at a relatively low noise level.

It will be further apparent that numerous modifications and variations may be made in the apparatus of the present invention, by any one skilled in the art, in accordance with the principles of the invention hereinabove set forth and without the exercise of any inventive ingenuity.

We claim:

1. Orienting and feeding apparatus for bottles, or the like, including an endless conveyor belt, means mounting said conveyor belt for movement with a lower portion thereof in tilted position and with its upper, outlet end portion in substantially horizontal position, and a plurality of spaced pairs of spaced cleats secured on said belt in transverse relation thereto, means along each edge of the horizontally disposed portion of said conveyor belt adapted to form an abutment for the base of a bottle disposed adjacent thereto, said space between said pairs of cleats disposed substantially opposite the center of said conveyor belt, and means over the upper portion of said conveyor belt opposite said space and adapted to fit therein engaging a bottle moved by each said pair of cleats to raise and overbalance and thereby upright the same on its base unto said conveyor belt.

2. The apparatus of claim 1, wherein said bottle-engaging and overbalancing means comprises a member supported over said upper conveyor belt portion, said member having at least its inner portion sloping upwardly from a point close to said belt and adapted to clear through the space between said pairs of cleats, and having side edges diverging outwardly toward the outlet end of said conveyor belt to a point distant from each longitudinal edge of the conveyor belt equal substantially to the thickness of the base portion of a bottle, to thereby provide a lane for moving erected bottles to each side of said member.

3. The apparatus of claim 2, wherein, and wherein said means alongside each edge of said horizontally disposed portion of said conveyor belt comprises upright side walls supported over the marginal edge portions of said conveyor belt, to each side of said member.

4. The apparatus of claim 3, wherein each said side wall is provided with a projecting shoulder overhanging said conveyor belt, said projecting shoulder having its inner end at a height substantially equal to the thickness of the base of a bottle and sloping gradually downwardly toward said conveyor belt in the direction of the outlet end thereof.

5. The apparatus of claim 3, wherein each said side wall is formed with the edge of its inner portion sloping downwardly towards said conveyor belt into close proximity thereto.

6. The apparatus of claim 5, wherein the lead edges of the sloping portions of said side walls are offset inwardly relative to the lead edge of said bottle raising member.

7. The apparatus of claim 1, in combination with a bin for bottles, said bin being of a width substantially equal to the width of said conveyor belt, the lower end of said conveyor belt extending into said bin.

8. The apparatus of claim 7, wherein the end portion of said conveyor belt within said bin is horizontally disposed.

9. The apparatus of claim 2, in combination with a horizontally disposed auxilliary conveyor belt substantially level with the outlet end of said apparatus, and means overhanging said outlet end of said apparatus engaging the bottles erected thereon and translating the same in erect position to said auxilliary conveyor belt.

10. The apparatus of claim 9, wherein said translating means comprises a pair of rotatable endless gripper belts opposite and overhanging each said lane on said conveyor belt, each said pair of gripper belts adapted to engage an erected bottle moving on the said conveyor belt of said apparatus and depositing said bottles in erected position on said conveyor belt.

11. The apparatus of claim 10, wherein said pairs of gripper belts converge towards one another in the direction of said conveyor belt whereby the bottles translated by them are deposited on said conveyor belt close to its longitudinal center.

12. The apparatus of claim 11, wherein the endless gripper belts of one of said pairs of gripper belts is supported in vertically offset relation relative to the other pair, and wherein the end of each said gripper belt of each said pair overhanging the outlet end of said conveyor belt is engaged over a sheave mounted on an individual, rotatable spindle, and wherein the end of the outermost of each of said pairs of gripper belts is longer than the inner one thereof and is engaged over an idler sheave mounted on an individual rod, and wherein the outer ends of the inner ones of said gripper belts are each engaged over an idler sheave mounted on a common rod.

* * * * *